United States Patent
Ling et al.

(10) Patent No.: US 7,739,305 B1
(45) Date of Patent: Jun. 15, 2010

(54) NETWORK APPLIANCE FOR DATA COLLECTION AND PROCESSING FROM MULTIPLE LOCATIONS AND DATA SCHEMA THEREFOR

(75) Inventors: Christopher Lanseng Ling, Palo Alto, CA (US); Michael Leonard Simmons, Monte Sereno, CA (US); Noel John Manicle, Castleknock (IE); Andrew John Flynn, Calverstown (IE)

(73) Assignee: Xilinx, Inc., San Jose, CA (US)

( * ) Notice: Subject to any disclaimer, the term of this patent is extended or adjusted under 35 U.S.C. 154(b) by 1356 days.

(21) Appl. No.: 11/192,344

(22) Filed: Jul. 28, 2005

(51) Int. Cl.
G06F 17/30 (2006.01)
(52) U.S. Cl. .................... 707/793; 707/803
(58) Field of Classification Search ............... 707/101, 707/104.1
See application file for complete search history.

(56) References Cited

U.S. PATENT DOCUMENTS

| | | | |
|---|---|---|---|
| 5,623,403 A | 4/1997 | Highbloom | |
| 6,148,307 A * | 11/2000 | Burdick et al. ........... | 707/104.1 |
| 6,161,106 A * | 12/2000 | Dailey et al. ............. | 707/102 |
| 6,523,045 B1 * | 2/2003 | Beatty .................... | 707/104.1 |
| 6,571,232 B1 | 5/2003 | Goldberg et al. | |
| 6,578,051 B1 * | 6/2003 | Mastronardi et al. ..... | 707/104.1 |
| 6,634,008 B1 * | 10/2003 | Dole ...................... | 716/1 |
| 6,658,429 B2 * | 12/2003 | Dorsett, Jr. .............. | 707/104.1 |
| 6,789,091 B2 * | 9/2004 | Gogolak ................. | 707/104.1 |
| 6,807,538 B1 * | 10/2004 | Weinberger et al. ....... | 707/3 |
| 6,839,713 B1 * | 1/2005 | Shi et al. ................. | 707/101 |
| 6,914,593 B2 * | 7/2005 | Lapstun et al. ........... | 345/156 |
| 7,218,980 B1 * | 5/2007 | Orshansky et al. ....... | 700/99 |
| 7,305,278 B2 | 12/2007 | Enright et al. | |
| 2002/0002560 A1 * | 1/2002 | Shah et al. .............. | 707/200 |
| 2003/0033287 A1 | 2/2003 | Shanahan et al. | |
| 2003/0037044 A1 | 2/2003 | Boreham et al. | |
| 2003/0061200 A1 | 3/2003 | Hubert et al. | |
| 2003/0061201 A1 | 3/2003 | Grefenstette et al. | |

(Continued)

OTHER PUBLICATIONS

Baker, Keith et al., "Shmoo Plotting: The Black Art of IC Testing," *Proceedings of the 1996 International Test Conference (ITC'96)*, Oct. 20-23, 1996, pp. 932-933, Washington, DC.

(Continued)

*Primary Examiner*—Don Wong
*Assistant Examiner*—Kim T Nguyen
(74) *Attorney, Agent, or Firm*—W. Eric Webostad; LeRoy D. Maunu (57) ABSTRACT

A network appliance, and a system and user interface therefor, are described. The network appliance includes a file capture module is to obtain files transmitted via a network and to load data from the files into a database. A user interface for communicating with the server includes a first set of fields and a second set of fields. The first set of fields are for selecting data from the database and the second set of fields are for selecting indices for charting the data selected with the first set of fields. A data processing module is configured to retrieve data from the database responsive to the data selected with the first set of fields, to chart the data retrieved responsive to the indices selected with the second set of fields, and to output a graph of the data charted to a server having access to the database.

15 Claims, 7 Drawing Sheets

U.S. PATENT DOCUMENTS

| | | | |
|---|---|---|---|
| 2003/0208480 | A1 | 11/2003 | Faulkner et al. |
| 2004/0002827 | A1* | 1/2004 | Iguchi ........................ 702/68 |
| 2004/0019604 | A1* | 1/2004 | Ballas et al. ............. 707/104.1 |
| 2004/0122859 | A1* | 6/2004 | Gavra et al. .............. 707/104.1 |
| 2004/0162816 | A1 | 8/2004 | Irle et al. |
| 2004/0225649 | A1 | 11/2004 | Yeo et al. |
| 2004/0254915 | A1 | 12/2004 | Motoyama et al. |
| 2005/0114304 | A1 | 5/2005 | White et al. |
| 2005/0114326 | A1 | 5/2005 | Smith et al. |
| 2005/0288815 | A1* | 12/2005 | Kawahara et al. ........... 700/121 |
| 2006/0106473 | A1* | 5/2006 | Enright et al. ................. 700/96 |
| 2006/0143244 | A1* | 6/2006 | Chia .......................... 707/204 |
| 2006/0214794 | A1* | 9/2006 | Wang ...................... 340/572.1 |

OTHER PUBLICATIONS

Yield Dynamics, "Genesis Enterprise," downloaded Sep. 19, 2005 from www.ydyn.com/products/genesis_enterprise.htm, pp. 1-4.
KLA-TENCOR, "Klarity ACE XP," downloaded Sep. 19, 2005 from www.kla-tencor.com/j/servlet/Product?prodID=25&focus=1.
U.S. Appl. No. 11/268,833, filed Nov. 8, 2005, Ling et al.

* cited by examiner

NETWORK APPLIANCE FOR DATA COLLECTION AND PROCESSING FROM MULTIPLE LOCATIONS AND DATA SCHEMA THEREFOR

FIELD OF THE INVENTION

One or more aspects of the invention relate generally to data capture and processing and, more particularly, to a network appliance for capturing data from multiple locations for selective processing by multiple users.

BACKGROUND OF THE INVENTION

Computers coupled in a network system have become an indispensable tool for enterprise-wide communication. Such network systems are often used to collect data from multiple locations for managing manufacturing of products. However, the amount and variety of this data has heretofore conventionally involved having multiple systems for collecting and processing the data. Accordingly, it would be desirable and useful to provide a network appliance that would provide a central point for data collection and user access to avoid having multiple, separately maintained data collection and processing systems.

SUMMARY OF THE INVENTION

One or more aspects of the invention generally relate to data capture and processing and, more particularly, to a network appliance for capturing data from multiple locations for selective processing by multiple users.

An aspect of the invention is a network appliance for manufacturing control via a network. A file capture module is configured to obtain files transmitted via the network and to load data from the files into a database. A server has access to the database. A user interface for communicating with the server includes a first set of fields and a second set of fields. The first set of fields are for selecting data from the database and the second set of fields are for selecting indices for charting the data selected with the first set of fields. A data processing module is configured to retrieve data from the database responsive to the data selected with the first set of fields, to chart the data retrieved responsive to the indices selected with the second set of fields, and to output a graph of the data charted to the server.

Another aspect of the invention is a user interface for a data capture and processing system comprising a first set of fields and a second set of fields. The first set of fields is for selecting data from a database. The second set of fields is for selecting indices for charting the data selected with the first set of fields. The first set of fields includes a device family field and a device type field, the device family field and the device type field having a hierarchical dependency. The first set of fields includes a fabrication facility field, the fabrication facility field and the device family field having a hierarchical dependency. The second set of fields includes a time range field, report type field, and an x-axis parameter field. The user interface is provided via a server as a web page.

Yet another aspect of the invention is a system for hosting data capture and processing comprising a computer which has a central processing unit, an input/output interface, and memory. The input/output interface is configured for network communication. At least a portion of the memory has a data capture and processing system. The data capture and processing system includes a file capture module, a server, a user interface, and a data processing module. The file capture module obtains files transmitted via a network and to load data from the files into a database. The server has access to the database. The user interface communicates with the server. The user interface includes a first set of fields and a second set of fields. The first set of fields is for selecting data from the database. The second set of fields is for selecting indices for charting the data selected with the first set of fields. The data processing module retrieves data from the database responsive to the data selected with the first set of fields, to chart the data retrieved responsive to the indices selected with the second set of fields, and to output a graph of the data charted to the server.

BRIEF DESCRIPTION OF THE DRAWINGS

Accompanying drawing(s) show exemplary embodiment (s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
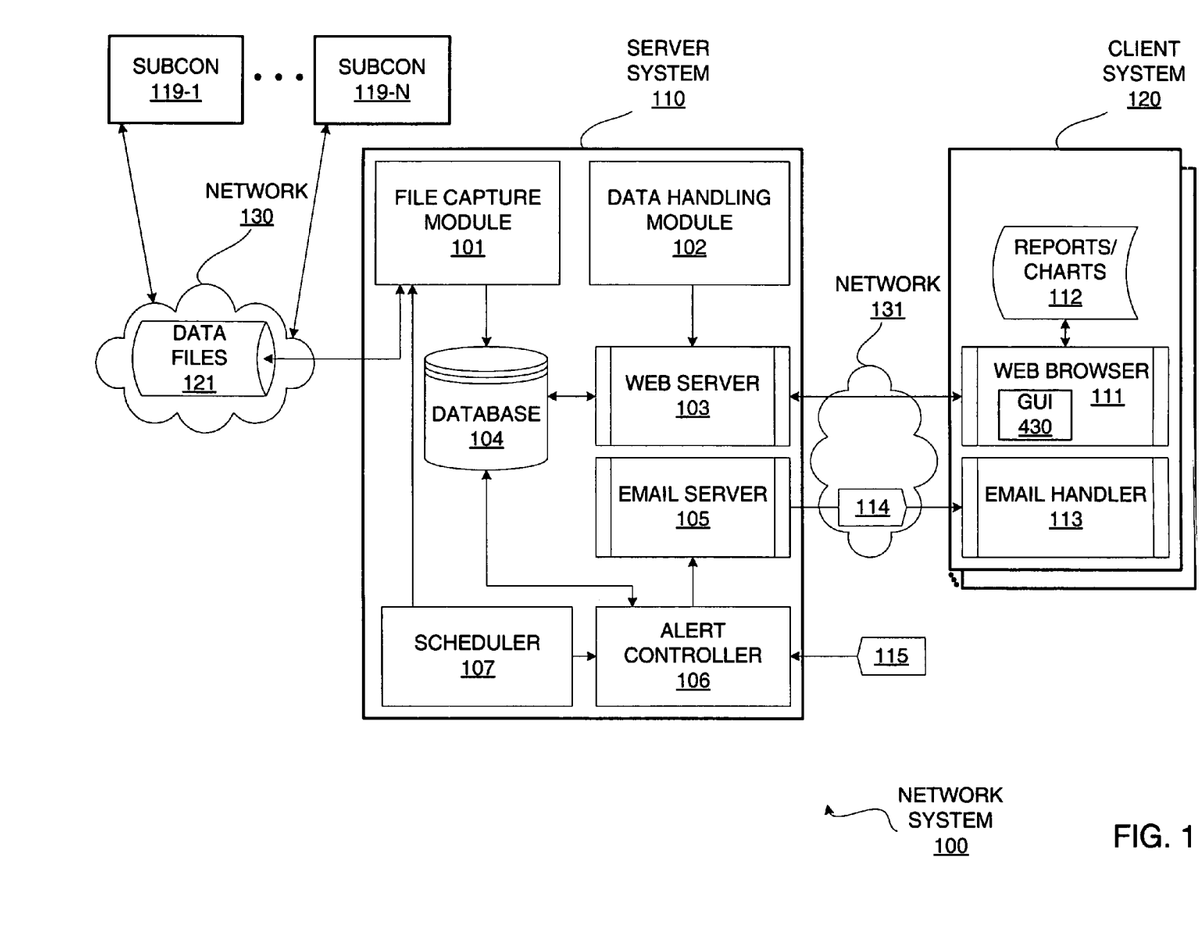
FIG. 1 is a high-level network diagram depicting an exemplary embodiment of a network system.

FIG. 1 is a high-level network diagram depicting an exemplary embodiment of a network system 100. Notably, network system 100 is described in terms of data collection for manufacturing of integrated circuits. It should be appreciated from the following description that data collection other than in the integrated circuit manufacturing field may be done in accordance with this disclosure. Thus, data associated with integrated circuit manufacturing is provided by way of example and not by way of limitation, as other types of data from multiple locations may be collected and processed in accordance with the following description.

One or more subcontractor manufacturing facilities ("subcons") 119-1 through 119-N, for N a positive integer greater than one, are coupled to network 130. Network 130 is used to communicate data files 121 from subcons 119-1 through 119-N to server system 110. There are many possible configurations for network 130, such as a wide area network ("WAN"), a local area network ("LAN"), or any combination of one or more WANs or LANs. Furthermore, network 130 may include use of the Internet or other public network. Notably, as used herein, the words "include" and "including" shall mean include or including without limitation. Thus, for example, one or more of subcons 119-1 through 119-N may be associated with testing a semiconductor wafer. One or more of subcons 119-1 through 119-N may be associated with one or more semiconductor wafer processing steps, including deposition, etching, or other known semiconductor processing steps. Another of one or more subcons 119-1 through 119-N may be associated with assembly of a die to a lead frame. Still another of one or more subcons 119-1 through 119-N may be associated with packaging die obtained from a tested semiconductor wafer. Thus, it should be appreciated that at any point during the integrated circuit fabrication and testing process, data may be obtained. Such obtained data may be generated and provided as data files 121 via network 130 to server system 110.

Server system 110 includes file capture module 101, user interface and data handling module 102, and web server 103. In this particular example, server system 110 includes database 104. However, in an implementation, database 104 may be external to server system 110. For example, database 104 may be a database available to server system 110 via a network connection. However, for purposes of clarity by way of example and not limitation, it shall be assumed that database 104 in this exemplary embodiment is included in server system 110. At thus juncture, it should be appreciated that server system 110 may be provided as a network appliance. By "network appliance," it is generally meant a data capturing and processing unit which may be coupled to a network for use by one or more clients.

Optionally, server system 110 may also include scheduler 107, email server 105, and alert controller 106.

Data files 121 are provided to file capture module 101. File capture module 101 may obtain data from data files 121 for formatting and loading into database 104. The frequency with which such data files 121 are provided to file capture module 101 need not be based on scheduled delivery by subcons 119-1 through 119-N, but may be scheduled using scheduler 107. Thus, scheduler 107 may be used to schedule when file capture module 101 queries subcons 119-1 through 119-N to obtain data files 121 via network 130.

It should be understood that in fabrication of an integrated circuit, many process, testing, packaging, and re-testing steps may be conducted. Conventionally, many of these operations involve collecting data. This data collection generally is automated, and accordingly file capture module 101 may query equipment associated with such automatic data collection for obtaining data files 121.

Alert controller 106 may be customized by a user to respond to one or more of alerts, alarms, limits, thresholds, or other types of manufacturing control indicators 115. These user provided or set manufacturing control indicators 115 may be used by alert controller 106 to check for an out-of-process tolerance condition, a condition heading to an out-of-process tolerance condition, other process stability indicators, or other criteria for control of manufacturability. Thus, alert controller 106 may access data in database 104 to determine whether for example data indicates heading toward an out-of-process tolerance condition, and thus an email notification 114 may be provided via email server 105 to alert management. Such email notification 114 may be provided to an email handler 113 of one or more client systems, such as client system 120. Notably, alert controller 106 may be configured to continually monitor data and to provide email notification, such as email notification 114, to control manufacturability. Alternatively or in combination with continuous monitoring, email notifications 114 may be provided on a scheduled basis responsive to a schedule of scheduler 107 in communication with alert controller 106.

After data has been obtained from captured data files 121 and formatted and loaded into database 104, a user may access such data, such as via client system 120 coupled to server system 110 via network 131. More particularly, a user interface, such as a textual or graphic user interface ("GUI") 430, may be provided in web browser 111 of client system 120 for communication with server system 110 via web server 103. This communication may be done over network 131, which may have a configuration like that of network 130 and may be part of network 130. Alternatively, as illustratively shown in FIG. 1, network 131 may be a more private network for communication between server system 110 and client system 120, such as an intranet. Furthermore, there may be security for limiting access to server system 110 by clients.

Using a user interface, which shall be assumed to be GUI 430 for purposes of clarity by way of example and not limitation, a user may select data to be charted. A data handling module 102, which may include data retrieval, charting, and output modules, may control web server 103 to access data from database 104, chart such accessed data, and provide resulting charts or reports 112, as well as optionally such data or a link to such data, to web browser 111 via network 131. Such charts or reports 112 may be locally stored on client system 120.

Thus, it should be understood that server system 110 is a data collection and processing network appliance. As such, it may be coupled to a network and may provide a centralized location for data collections and processing, as well as user access to such data collected and processed. Server system 110 may be configured to automatically fetch, parse, load, process, and analyze manufacturing data. Data extraction and analysis tools may be accessible to users via network 131 as a web page application service. Notably, users may access such data and associated applications from any computer configured with web browsing. Thus, it should be appreciated that installation of special client software may be avoided. Additionally, server system 110 may be configured to monitor data against statistical thresholds, limits, or other manufacturing control targets, and to notify users if a manufacturing process violates any of such controls.

Figure 2:
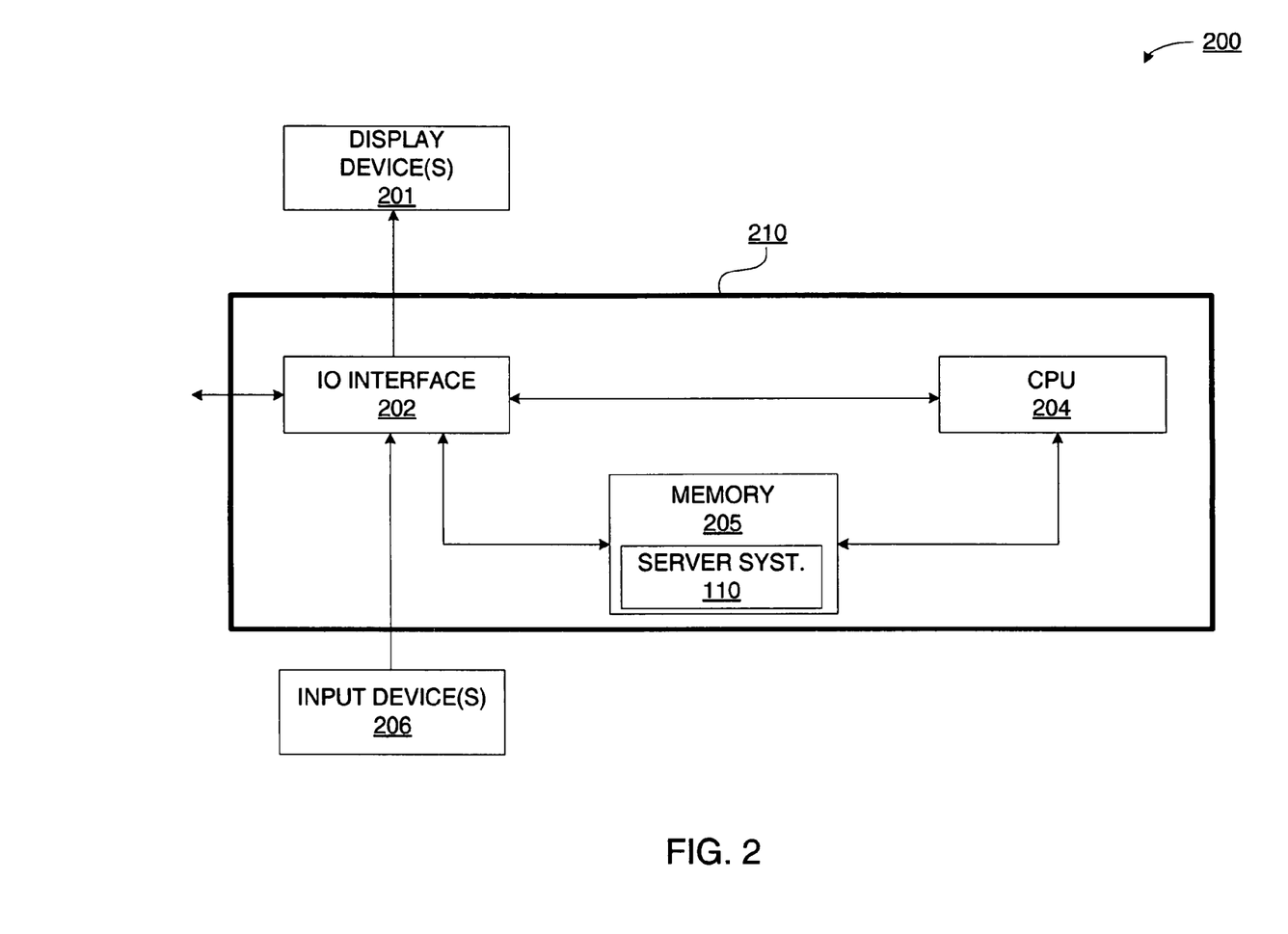
FIG. 2 is a high-level block diagram of an exemplary embodiment of a computer system configured to provide a server system.
Figure 3:
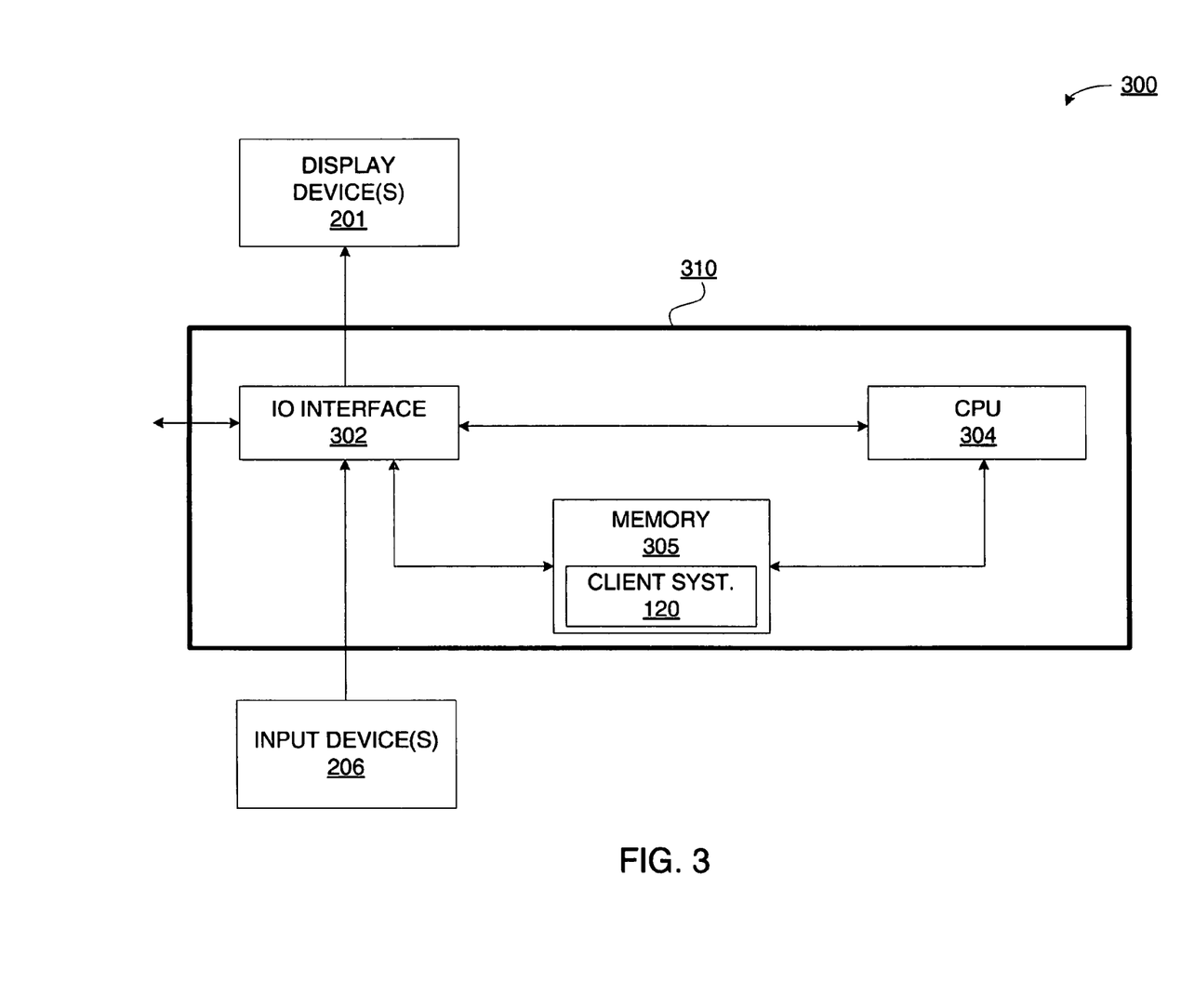
FIG. 3 is a high-level block diagram of an exemplary embodiment of a computer system configured to provide a client system.

FIGS. 2 and 3 are high-level block diagrams of exemplary embodiment of computer systems 200 and 300, respectively. Computer systems 200 and 300 may include programmed computers 210 and 310, respectively. Each of programmed computers 210 and 310 may be coupled to one or more display devices 201, such as Cathode Ray Tube ("CRT") displays, Plasma displays, Liquid Crystal Displays ("LCD"), and to one or more input devices 206, such as a keyboard and a cursor pointing device. Other known configurations of a computer system may be used.

With simultaneous reference to FIGS. 2 and 3, programmed computer 210 or 310 may be programmed with a known operating system, which may be OS/2, Mac OS, Java Virtual Machine, Linux, Solaris, Unix, or a Windows operating system, among other known platforms. For example, programmed computer 210 may be a Linux workstation server using Red Hat Enterprise Linux available from Red Hat, Inc. of Raleigh, N.C. Programmed computer 310 may be a personal computer, personal data assistant ("PDA"), or other device capable of supporting a web browser. Notably, programmed computer 310 may be what is known as a "thin" client, namely it need not have any database.

Programmed computer 210 includes a central processing unit ("CPU") 204, memory 205, and an input/output ("IO") interface 202. CPU 204 may be a type of microprocessor known in the art, such as available from IBM, Intel, and Advanced Micro Devices for example. Support circuits (not shown) may include conventional cache, power supplies, clock circuits, data registers, and the like. Memory 205 may be directly coupled to CPU 204 or coupled through IO interface 202. At least a portion of an operating system may be disposed in memory 205. Memory 205 may include one or more of the following: random access memory, read only memory, magneto-resistive read/write memory, optical read/write memory, cache memory, magnetic read/write memory, and the like, as well as signal-bearing media as described below.

IO interface 202 may include chip set chips, graphics processors, and daughter cards, among other known circuits. An example of a daughter card may include a network interface card ("NIC"), a display interface card, a modem card, and a Universal Serial Bus ("USB") interface card, among other known circuits. Thus, IO interface 202 may be coupled to a conventional keyboard, network, mouse, display printer, and interface circuitry adapted to receive and transmit data, such as data files and the like. Notably, programmed computer 210 may be coupled to a number of client computers, server computers, or any combination thereof via a conventional network infrastructure, such as a company's Intranet and/or the Internet, for example, allowing distributed use for interface generation.

Programmed computer 310 includes a central processing unit ("CPU") 304, memory 305, and an input/output ("IO") interface 302. The description of components of programmed computer 310 is the same as corresponding components of programmed computer 210, and thus such same description is not repeated.

Memory 205 may store all or portions of one or more programs or data to implement processes in accordance with one or more aspects of the invention to provide server system 110. Memory 305 may store all or portions of one or more programs or data to implement processes in accordance with one or more aspects of the invention to provide client system 120. Additionally, those skilled in the art will appreciate that one or more aspects of the invention may be implemented in hardware, software, or a combination of hardware and software. Such implementations may include a number of processors independently executing various programs and dedicated hardware or programmable hardware.

One or more program(s) of the program product of server system 110, as well as documents thereof, may define functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Furthermore, such signal-bearing media may be in the form of a carrier wave or other signal propagation medium via a communication link for streaming information, including downloading all or a portion of a computer program product. Such signal-bearing media, when carrying computer-readable instructions that direct functions of one or more aspects of the invention, represent embodiments of the invention.

Figure 4A:
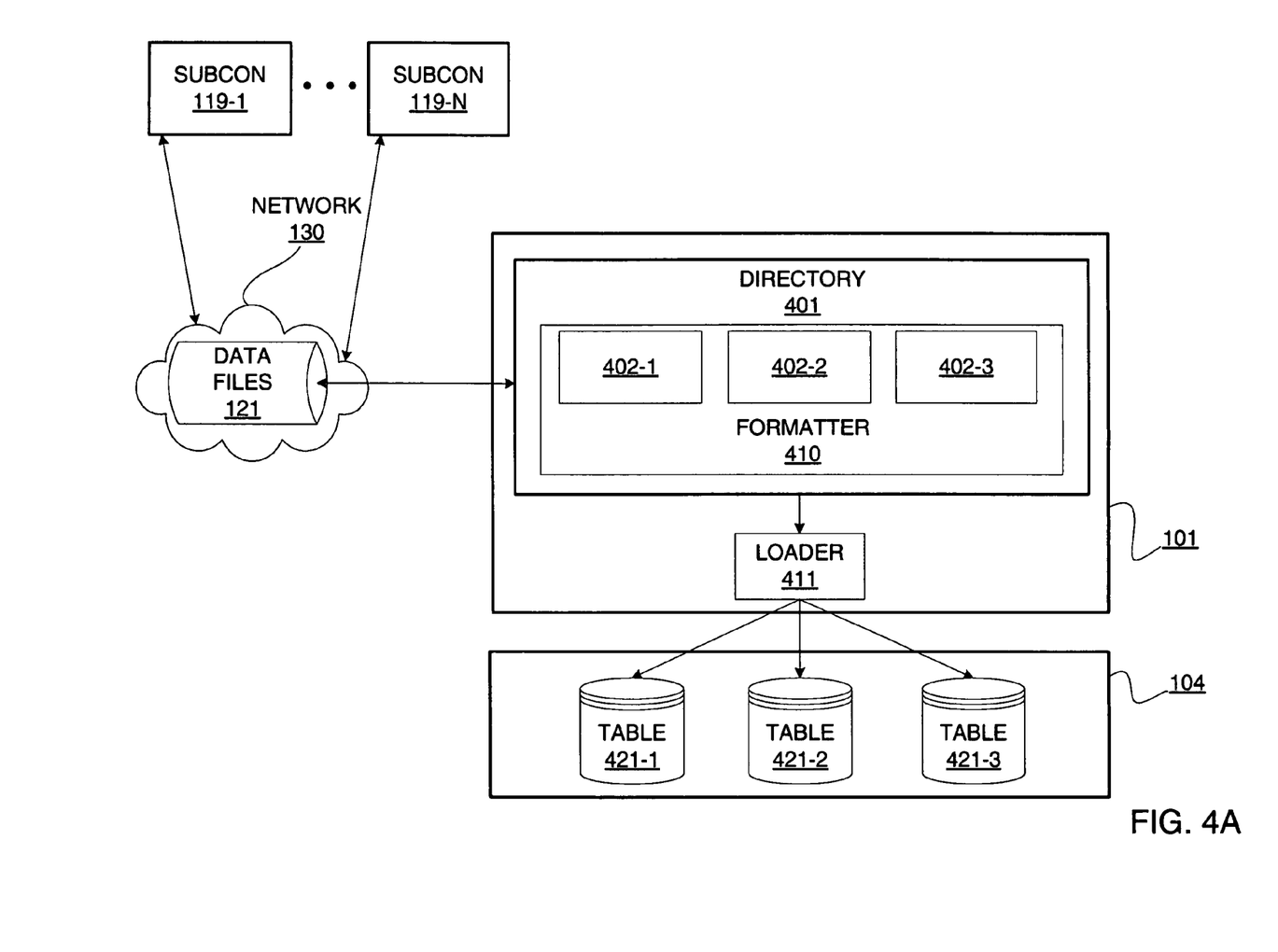
FIG. 4A is a high-level block diagram depicting an exemplary embodiment of interaction between a file capture module and a database.

FIG. 4A is a high-level block diagram depicting an exemplary embodiment of interaction between file capture module 101 and database 104 of FIG. 1. As previously described, data files 121 may be provided via network 130 to file capture module 101. These data files 121 may be provided using a file transfer protocol ("FTP") or other known method of communication of data files via a network.

Data files 121 may be provided to a directory 401 associated with file capture module 101. A formatter 410 of file capture module 101 may include a plurality of data file format modules 402-1 through 402-3. Though three data file format modules 401-1 through 402-3 are illustratively shown, it should be appreciated that fewer or more data file format modules may be used. For example, data file format module 402-1 may be a user-defined data format. Data file format module 402-2 may be a well-known data format, such as comma-separated value format. Data file format module 402-3 may be a data file format for a particular type of report, such as for testing performance over a range of voltages.

Thus, data in data files 121 arriving from network 130 is put into at least one file format associated with data file format modules 402-1 through 402-3. For example, if a file format was used to provide data in data files 121, such file data would be converted as needed to one of the formats associated with data file format modules 402-1 through 402-3 by formatter 410. If a new data file format is desired, a module may be added for it.

After formatting data, a loader 411 of file capture module 101 receives such formatted data files from formatter 410. Loader 411 allocates such data to tables associated therewith of database 104. In other words, loader 411 allocates data to one or more tables by one or more of file name and data type, as well as contents, as loader 411 may read captured files. In this particular example, database 104 is illustratively shown with tables 421-1 through 421-3. However, it should be appreciated that fewer or more tables than three may be implemented. For example, table 421-1 may be associated with a particular type of report or test, such as a single wafer acceptance test ("SWAT"). Table 421-2 may be associated with another type of report or test, such as a wafer acceptance test ("WAT"). Table 421-3 may be associated with yet another type of report or test, such as a supply voltage variation test ("SHMOO"). Thus, data obtained in a file format is associated with one or more tables of database 104. By sorting data into data associated with particular types of report outputs on a table-by-table basis, retrieval of such data responsive to a user-designated report is facilitated.

Figure 4B:
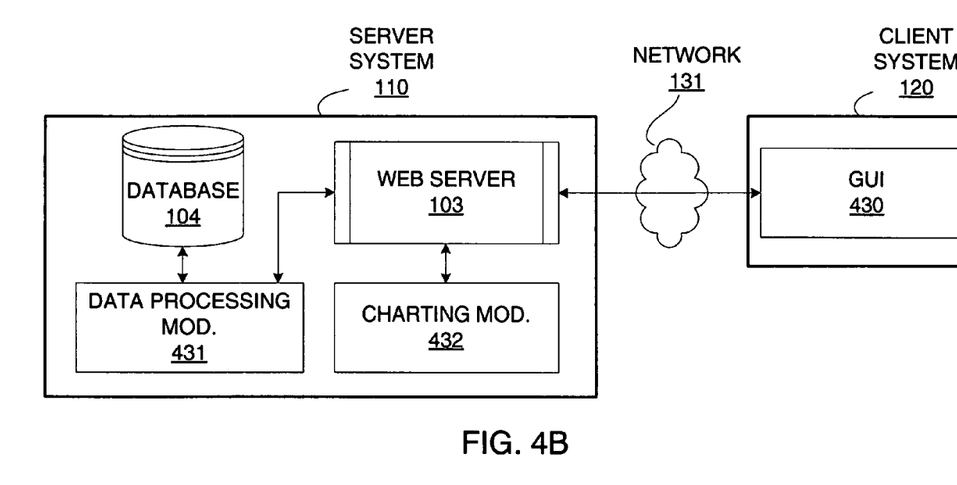
FIG. 4B is a high-level block diagram depicting an exemplary embodiment of an output side of a server system for providing data to a client system.

FIG. 4B is a high-level block diagram depicting an exemplary embodiment of an output side of server system 110 for providing data to client system 120. In an implementation, database 104 may be a MySQL database server, an open source database available from MySQL, Inc. of Seattle, Wash. Furthermore, web server 103 in an implementation may be an Apache web server product, an open source web server available from The Apache Software Foundation of Forrest Hills, Md. Responsive to user selection input via GUI 430 of client system 120, web server 103 instructs data processing module 431 to retrieve data from database 104. Data processing module 431 may be a Perl Hypertext Preprocessing ("PHP") script. Responsive to user input of a report type, for example, data processing module 431 will access an associated table in database 104 and provide a user interactive report via GUI 430. Data accessed responsive to user input via GUI 430 may be limited to a date range, a particular fab, a particular lot of wafers, a particular wafer, a particular family of devices, a particular device, or other limitation as described below in additional detail with reference to examples and implementations of GUI 430.

After retrieving requested data from database 104, data processing module 431 provides such data to web server 103 for output to client system 120. Web server 103 may be coupled to a charting module 432. Charting module 432 may be implemented with a program configured to provide a chart of data which may be communicated via a network. For example, charting module 432 in an example implementation may include both a Jp Graph available from Aditus Consulting of Stockholm, Sweden and an Easycharts available from Object Planet of Oslo, Norway. These programs may provide charts in the form of a web page component, such as a portable graphic object, which may be static or interactive. For example, a Portable Network Graphic ("PNG") or any other known graphic object displayable on a web page may be used. Such a network portable graphic may be communicated using a hypertext transfer protocol ("HTTP") header indicating the type of data via web server 103 to GUI 430. In addition to providing a chart of requested data, the actual data may be provided to client system 120. Accordingly, referring back to client system 120 of FIG. 1, such charts or reports 112 may be stored on client system 120. Additionally, a chart may be provided to client system 120 with a hypertext link to data associated with such chart. A client system's web browser, such as IE, Firefox, Safari, or other known web browser, may be used to request and to display the chart.

Figure 4C:
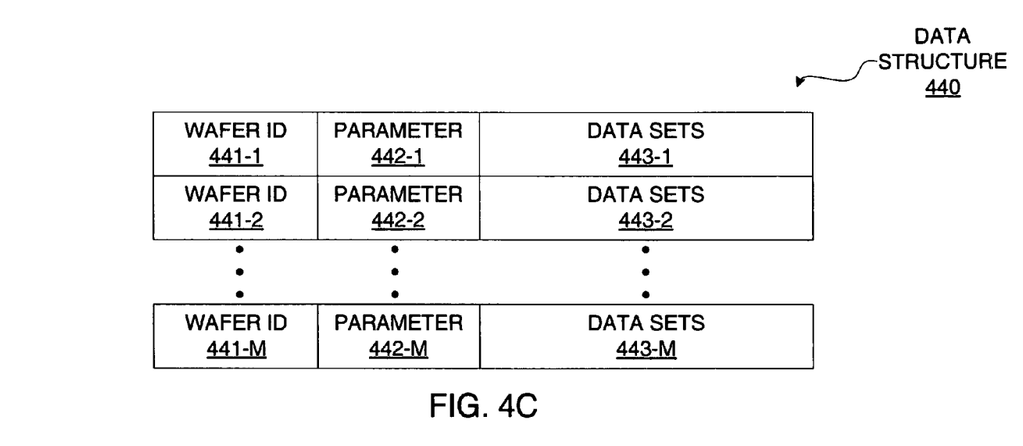

FIG. 4C is a block diagram depicting an exemplary embodiment a data structure 440 that may be used to store data in database 104 of FIG. 4B. Each row of data structure 440 includes a wafer identifier, a parameter, and data associated with the parameter for that wafer. For example, wafer identifiers 441-1 through 441-M, for M a positive integer, are respectively associated with parameters 442-1 through 442-M. Parameter data sets 443-1 through 443-M are respectively associated with parameters 442-1 through 442-M for each wafer identifier 441-1 through 441-M. Data sets 443-1 through 443-M may include an X value and a Y value. The X value and the Y value indicate a die of a wafer. Thus, by associating X and Y wafer coordinates to one or more parameter values for a wafer, each die data point for a parameter for an identified wafer may be grouped into a single row. There are many known parameters that may be used in testing a wafer or a die from a wafer, including temperature, voltage, amperage, resistance, speed, and frequency, among other known parameters. The X and Y values, for example, for data set 443-1 are for each die of a wafer associated with wafer identifier 441-1. Thus, each data point for each die of a wafer for a parameter 442 may be in a single row. This facilitates data retrieval and processing for parameterized charting of data. Additionally, data values such as mean and median for each row may be determined by loader 411 of FIG. 4A, which reads such data. Thus, statistical values may be determined and stored as part of loading a database 104 of FIG. 4A. Notably, separate tables 421 of FIG. 4A may be for statistical values, and thus such tables may indicate row by row a wafer identifier 441, a parameter 442, and associated statistical values.

For purposes of clarity by way of example, suppose a wafer has 3,000 die candidates, where each die candidate has 200 parameters. By grouping all data values for each die for a parameter for a wafer in a row, the number of rows is 200. This significantly increases performance with respect to data retrieval as compared to having 3,000 rows, namely one row for each die. In other words, rather than having significant dependency on a database program, such dependency is moved to the CPU, such as CPU 204 of FIG. 2, to improve performance. Furthermore, to increase performance, each data file 121 may be loaded into solid state memory for loader 441 to read and process prior to loading database 104.

Figure 5A:
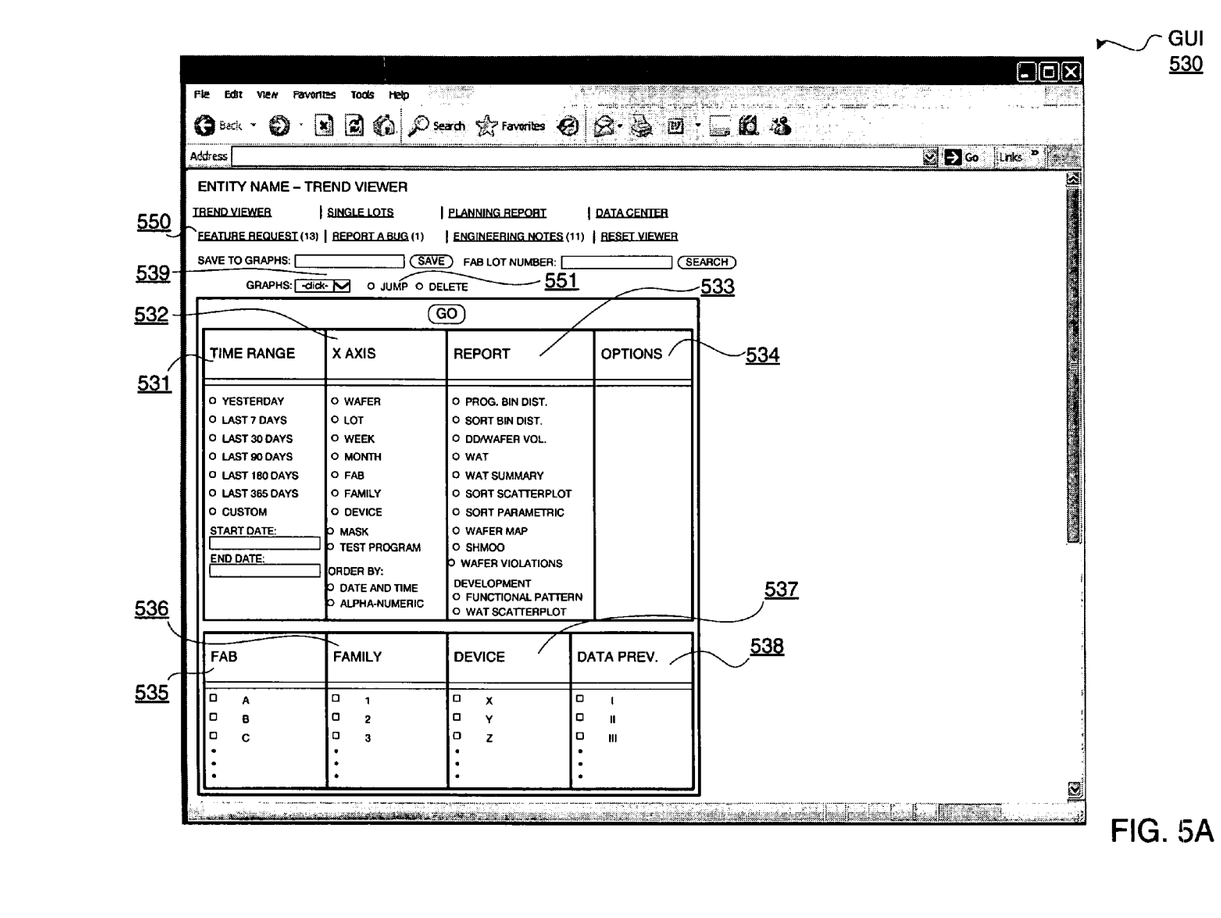
FIG. 5A is a screen view depicting an exemplary embodiment of a graphic user interface.

FIG. 5A is a screen view depicting an exemplary embodiment of a GUI 530. GUI 530 is shown as part of a screen display window for a web browser, which may be displayed on a display device. Notably, GUI 530 is for a trend viewer to view trends of a fab. Other types of viewing may be for single lots, planning reports, or a general data center. Additionally, there may be feedback to the webmaster, such as requesting a feature or reporting a bug. For example, responsive to selection of feature request 550, contextual content of GUI 530, such as selections, may be automatically stored for webmaster retrieval. Furthermore, associated engineering notes may be listed.

A graph pull-down menu 539 may be used along with selecting jump 551 to access a previously used graph format. Otherwise, fields for generating a graph may be selected. One of such fields may be a time range field 531. Time range field 531 may be configured using a start date and an end date. Alternatively, fixed, pre-defined values may be used, such as "yesterday," "last 7 days," "last 30 days," "last 90 days," "last 180 days," or "last 365 days." Time range field 531 provides a time range for which the data shall be retrieved. X axis field 532 is to select an X axis for a chart to be generated. Examples of X axis parameters include wafer, lot, week, month, fab, product family, device, mask, and test program. Mask is to indicate a device mask set used for fabrication, and test program is to indicate a test program revision used to generated the data. X axis data may be ordered by date and time or alpha-numerically. Report field 533 may be used to select a pre-defined type of report. Examples of types of reports listed include a progressive bin distribution, a sort by bin distribution, a defect density by wafer volume, a WAT, a WAT summary, a WAT violations, a sort scatter plot, a sort by parameter, or wafer maps. Reports that might be developed include a functional pattern and a WAT scatter plot. By "developed," it is meant currently under development to be tested and released at a future date. Additionally, there may be an options field 534 to report specific options relevant to each of the different reports.

A fab field 535 may be used to select a fab for which associated data is to be retrieved from database 104 of FIG. 1. Family field 536 may be used to specify a family of the devices associated with the fab selected in field 535. In other words, fields 535 and 536 are hierarchical; a fab selection in field 535 will identify which family or families of devices produced from such fab are available for data retrieval as associated with field 536.

Furthermore, device field 537 may be used to select a device or devices within a family or families selected responsive to family field 536. Thus, family field 536 and device field 537 are hierarchical, meaning that a selection of a family or families in family field 536 will generate options of selectable devices within those families for device field 537. A data preview field 538 may be used to view previously generated data reports. The options appearing for selection under data preview field 538 may be hierarchical with respect to an entry selected for X axis field 532. For example, a data preview of prior lot data where a lot is selected for X axis field 532 is an example of the data options that might appear for preview.

Figure 5B:
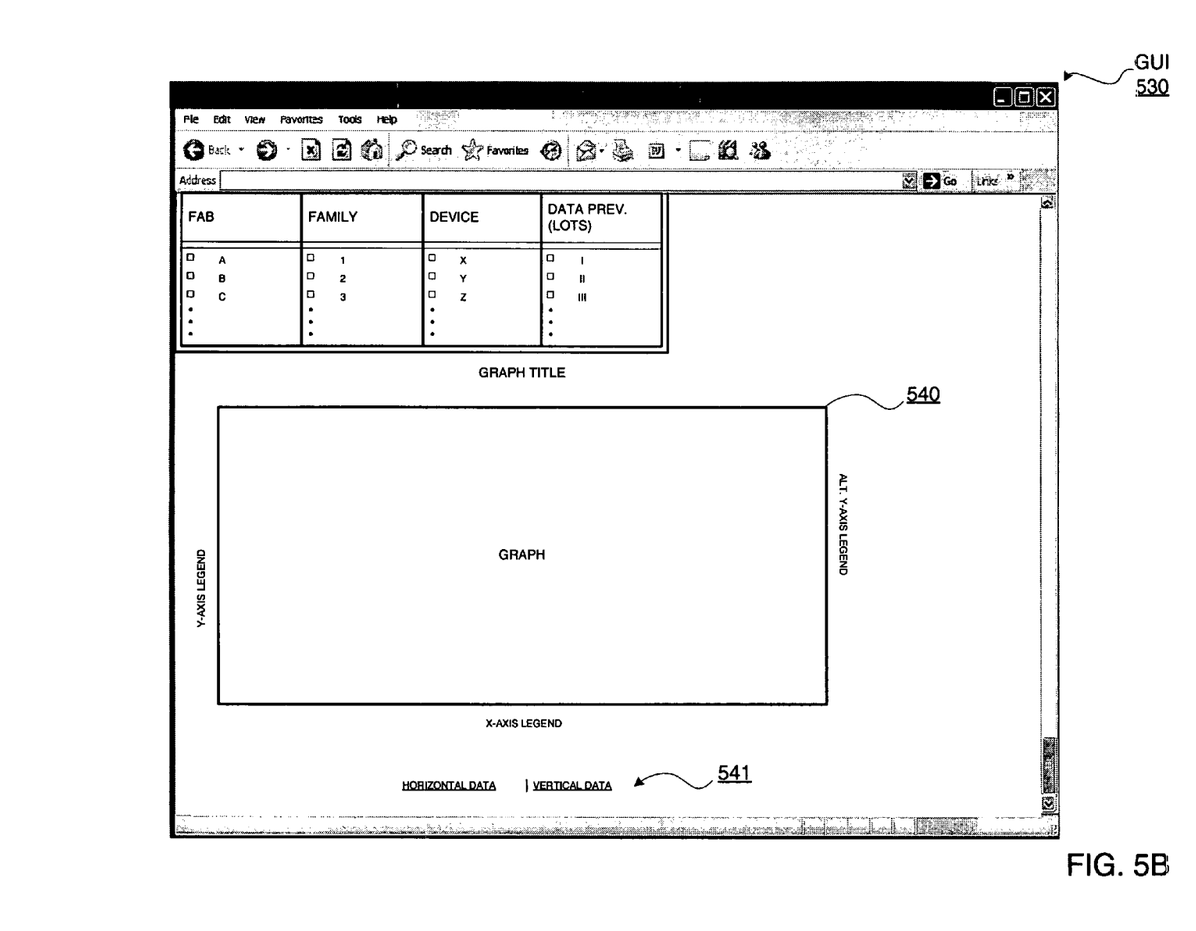
FIG. 5B is a screen view depicting an exemplary embodiment of the graphic user interface of FIG. 5A having a graph linked to fields used to select data for retrieval.

After fields have been selected in GUI 530, data associated with such fields may be retrieved and charted as previously described. A chart may be generated in association with such data. FIG. 5B is a screen view depicting an exemplary embodiment of GUI 530 having a graph 540 linked to the fields used to select data for retrieval. Furthermore, one or more links 541 to horizontal and vertical data for graph 540 may be provided to view data associated with the generation of such graph.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A network appliance, comprising:
    a database stored in a memory;
    a file capture module configured to obtain manufacturing data files transmitted via a first network and to load data from the manufacturing data files into the database;
    a data processing module configured to retrieve data from the database responsive to data selected with a first set of fields, to chart the data retrieved responsive to indices selected by a client system using a second set of fields, and to output a graph of the data charted to a web server, the web server sending the graph to the client system via a second network, and wherein the first set of fields comprises a first field and second field of the first set of fields;
    wherein the data processing module is further configured to display respective sets of selectors corresponding each of the first and second fields, and in response to user selection of a selector in the respective selector set of the first field, the data processing module displays only selectors of the respective set of selectors of the second that are hierarchically related to the selected selector;
    wherein the data is loaded into respective tables of the database, the tables being associated with the first set of fields;
    wherein the data loaded is stored in the tables according to a wafer identifier for a wafer, a parameter, and a data set for rows of the tables; and
    wherein the data set includes values associated with a parameter for the IC dies on a die-by-die basis for the wafer.

2. The network appliance according to claim 1, wherein the web server is internal to the network appliance.

3. The network appliance according to claim 1, wherein the first and second networks are part of one network.

4. The network appliance according to claim 1, wherein the graph is a graph object embeddable in a Hypertext Transport Protocol and wherein the data processing module includes a Preprocessing Hypertext script.

5. The network appliance according to claim 1, wherein the first set of fields includes a device family field and a device type field, the device family field and the device type field having a hierarchical dependency.

6. The network appliance according to claim 5, wherein the first set of fields includes a fabrication facility field, the fabrication facility field and the device family field having a hierarchical dependency.

7. The network appliance according to claim 6, wherein the second set of fields includes a time range field and report type field.

8. The network appliance according to claim 7, wherein the second set of fields includes an x-axis parameter field.

9. The network appliance according to claim 1, further comprising a scheduler to cause the file capture module to obtain the manufacturing data files on a schedule from manufacturing facilities coupled to the file capture module via the first network.

10. The network appliance according to claim 9, further comprising:
    an alert controller for storing manufacturing control indicators and configured to generate email notices responsive to the data loaded into the database; and
    an email server configured to send the email notices.

11. The network appliance according to claim 10, wherein the scheduler is configured to cause the alert controller to generate the email notices according to another schedule.

12. A computer readable storage medium having computer-executable instructions for performing a method to analyze manufacturing data, the method comprising:
    receiving manufacturing information related to fabrication of a plurality of semiconductor dies and storing the manufacturing information in a database;
    displaying on a graphical user interface, as part of a Web based system, a plurality of choices under each of a plurality of fields;
    in response to user selection of one of the choices under a first field of the plurality of fields, limiting user selectable choices under a second field of the plurality of fields to choices that are hierarchically related to the selected one of the choices under the first field;
    responsive to selected one or more of the plurality of choices, generating a graph using the database indicating a trend for at least part of the manufacturing information;
    displaying the graph on the graphical user interface;
    loading data in a plurality of data formats into respective tables of the database, the tables being associated with the plurality of interdependent fields;
    storing the data in the tables according to a wafer identifier for a wafer, a parameter, and a data set for rows of the tables,
    wherein the data set includes values associated with a parameter for IC dies on a die-by-die basis for the wafer.

13. The storage medium of claim 12 wherein the plurality of interdependent fields is selected from a group consisting of a fabrication field, a family field, a device field, and a lot field.

14. The storage medium of claim 12, wherein the plurality of fields includes an X-axis field, and each choice under the X-axis field corresponds to a different X-axis for a chart, and the method further including, in response to user selection of one of choices under the X-axis field, generating the graph with an X-axis corresponding to the selected one of the X-axis choices.

15. The network appliance according to claim 1, wherein the second set of fields includes an X-axis field and the X-axis field includes a plurality of X-axis selectors, each X-axis selector corresponding to a different X-axis for a chart, and the data processing module is further configured to display the X-axis selectors and in response to user selection of one of the X-axis selectors, generate the graph of the data charted with an X-axis corresponding to the selected one of the X-axis selectors.

* * * * *